United States Patent Office 3,598,803
Patented Aug. 10, 1971

3,598,803
1-PHENYLAZO-2,3-HYDROXYNAPHTHOLIC ACID PHENYL AMIDE CONTAINING A SULFONIC ACID IMIDO-UREIDE GROUP
Armand Henrard, Gand, Belgium, and Fritz Kehrer and Hans Wasem, Basel, Switzerland, assignors to Sandoz Ltd. (also known as Sandoz A.G.), Basel, Switzerland
No Drawing. Filed Dec. 19, 1967, Ser. No. 691,707
Claims priority, application Switzerland, Jan. 17, 1967, 630/67; Jan. 26, 1967, 1,173/67
Int. Cl. C07c *107/08;* C09b *29/20*
U.S. Cl. 260—204
8 Claims

ABSTRACT OF THE DISCLOSURE

Pigments of the monoazo series which contain a nuclearly bound sulfonic acid imido-ureide group are useful for the coloration of plastics, textiles, paper, natural resins and rubber.

DESCRIPTION

This invention relates to pigments of the monoazo series which contain a substituted sulphonic acid amide group in the molecule and to the production of these pigments and their use for the coloration of plastics, textiles, paper, natural resins and rubber.

These pigments have the formula

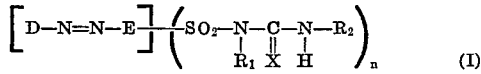

(I)

where D stands for the radical of a diazo component of the aromatic or heterocyclic series, E for the radical of a coupling component, $R_1$ for a hydrogen atom, a hydrocarbon radical which may be substituted, or an acyl radical, $R_2$ for a hydrogen atom or for a radical of the formula

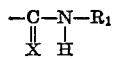

X for an oxygen or sulphur atom or for the =NH group, and $n$ for 1 or 2, and where the molecule is free from carboxylic acid and sulphonic acid groups.

These compounds are produced by diazotizing a diazo compound of formula $$D—NH_2 \qquad (II)$$

and coupling the resulting diazonium compound with a coupling component of formula $$H—E \qquad (III)$$

wherein the radical D of (II) or the radical E of (III) bears a group of formula

(IV)

The preferred radicals D in the diazo components are phenyl radicals which may be substituted if desired. Phenyl, naphthyl or pyrazolone radicals, which likewise may be substituted, are examples of E radicals. These radicals may bear any desired non-water-solubilizing substituents, in particular those commonly present in pigments, for example halogen atoms, notably chlorine or bromine atoms, alkyl or alkoxy groups of lower molecular weight, i.e. those containing 1 to 4 carbon atoms, hydroxyl, amino, aryl, aryloxy, acyl, acylamino, carboxylic acid ester, cyano or nitro groups, or N-substituted carboxylic acid amide or sulphonic acid amide groups. All the hydrocarbon substituents may themselves be substituted, for example by halogen atoms, hydroxyl or cyano groups.

The acyl groups may be radicals of formula R—X or R'—Y, where R stands for a hydrocarbon radical which may bear non-water-solubilizing substituents and/or may contain hetero atoms, X for —OCO— or —$SO_2$—, R' for a hydrogen atom or R, Y for —CO—, —NR"CO— or —NR"$SO_2$—, and R" for a hydrogen atom or R.

Hydrocarbon radicals of prime interest are lower alkyl radicals, i.e. those bearing 1 to 4 carbon atoms, and phenyl radicals, which may contain any of the aforecited substituents.

The preferred pigments have the formula

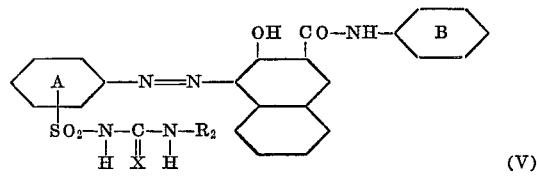

(V)

or

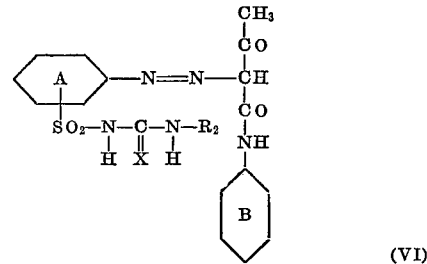

(VI)

In these formulae the benzene nuclei A and B may bear any desired non-water-solubilizing substituents, for instance the aforementioned ones. They are produced by diazotizing an amine of formula

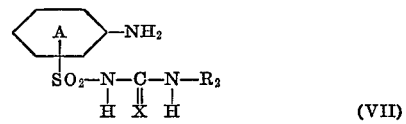

(VII)

and coupling the resulting diazonium compound with a compound of formula

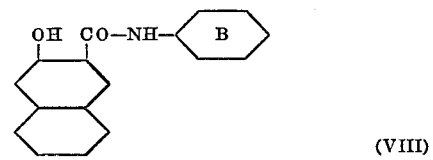

(VIII)

or

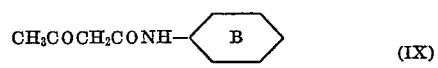

(IX)

The coupling reaction is conducted in the normal manner in a weakly acid, neutral or alkaline medium at room temperature or with cooling.

The new compounds have outstanding properties as pigments. They are virtually insoluble in the commonly used solvents and have very good rheological properties. Applications for which they are suitable include the dyeing of paper stock, the mass coloration of plastics in solution or other forms, the coloration of natural and synthetic resins and rubber, and the printing of textiles and paper.

It is of advantage to prepare the pigments in paste form before application. For this purpose they are submitted to mechanical treatment in ball or roller mills or other suitable equipment and if necessary in the presence of dispersing agents, such as the condensation products of naphthalenesulphonic acids and formaldehyde. The pigment pastes can be used for pigmentation in the paste form as obtained, or they can be dried and the resulting powders ground.

In the aforenamed materials the pigments are outstandingly resistant to migration and fast to light, and have very goodfastness to washing, chlorine, hypochlorite and peroxide bleaching, cross dyeing, blind vats, hydrosulphite, dry cleaning, rubbing, overlacquering and solvents. They show good transparency and heat stability.

The parts and percentages given in the examples are by weight and the temperatures are in degrees centigrade.

EXAMPLE 1

2.4 parts of 1-amino-2-methoxybenzene-5-sulphonic acid-imidoureide are dissolved in 300 parts of water and 38 parts of 30% hydrochloric acid. The solution is cooled to 0° and 20 parts of a 5-normal solution of sodium nitrite are added for diazotization. When the diazonium salt solution has formed, it is allowed to run slowly at 20° into a solution of 38 parts of 2-hydroxy-3(3'-chloro-4',6'-dimethoxyphenylaminocarbonyl)-naphthalene in 400 parts of ethanol, 800 parts of water and 50 parts of 30% sodium hydroxide solution. On completion of the coupling reaction the batch is acidified with acetic acid, raised to 90° and filtered. The residue, a red pigment, is washed with water and dried at 60°. It is resistant to migration in polyvinyl chloride and is fast to light in this and the other named materials. When the pigment is previously treated with heating in an organic solvent, for example mono-, di- or tri-chlorobenzene, nitrobenzene, or, in particular, dimethyl formamide, it exhibits a more brilliant and intense shade in the pigmented or dyed material.

The 1-amino-2-methoxybenzene-5-sulphonic acid imidoureide can be prepared by condensing 1-amino-2-methoxybenzene-5-sulphonic acid amide with guanidine nitrate in alkaline medium by one of the known methods.

EXAMPLE 2

A diazonium salt solution is prepared with 24.4 parts of 1-amino-2-methoxybenzene-5-sulphonic acid imidoureide in accordance with the procedure of Example 1. It is dropped into a solution of 31.4 parts of 2-hydroxy-3-(2'-methoxyphenylaminocarbonyl)-naphthalene in 400 parts of ethanol, 800 parts of water and 50 parts of 30% sodium hydroxide solution. The reaction mixture is then acidified and raised to 90°, and the product filtered off, washed with water and dried at 60°. It is a red pigment and has valuable properties, comparable to those of the product obtained by the procedure of Example 1.

The tabulated examples which follow, give the formulae of the diazo components and the R''' groups of the coupling components of formula

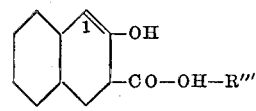

The components can be reacted as detailed in Example 1. Coupling with the diazonium compound takes place in position 1 of the naphthalene nucleus. The shade of the resulting pigments in polyvinyl chloride is noted in the last column of the table.

| Example No. | Diazo component | R''' | Shade in PVC |
|---|---|---|---|
| 3 | CH₃ — ⌬ — NH₂ ; SO₂—NH—C(=NH)—NH₂ | OCH₃ — ⌬ — Cl ; OCH₃ | Red. |
| 4 | Same as above | CH₃ — ⌬ — Cl | Bordeaux. |
| 5 | CH₃ — ⌬ — NH₂ ; SO₂—NH—C(=NH)—NH—C(=NH)—NH₂ | OCH₃ — ⌬ — OCH₃ ; Cl | Red. |
| 6 | CH₃ — ⌬ — NH₂ ; SO₂—NH—C(=NH)—NHCONH₂ | Same as above | Red. |
| 7 | CH₃ — ⌬ — NH₂ ; SO₂NH—C(=NH)—NH | do | Red. |

| Example No. | Diazo component | R''' | Shade in PVC |
|---|---|---|---|
| 8 | 4-amino-3-methylphenyl-SO₂NH-C(=NH)-NH₂ | ...do... | Red. |
| 9 | 4-aminophenyl-SO₂NH-C(=NH)-NH₂ | ...do... | Red. |
| 10 | 2-methoxy-4-amino-5-(SO₂-NH-C(=NH)-NH₂)-phenyl | 2,5-dimethoxy-4-chlorophenyl | Red. |
| 11 | Same as above | 2-methyl-5-chlorophenyl | Bordeaux. |
| 12 | 2-methoxy-4-amino-5-(SO₂-NH-C(=NH)-NH-C(=NH)-NH₂)-phenyl | 2,5-dimethoxy-4-chlorophenyl | Red. |
| 13 | 2-methoxy-4-amino-5-(SO₂-NH-C(=NH)-NHCONH₂)-phenyl | Same as above | Red. |
| 14 | 4-aminophenyl-SO₂NH-C(=NH)-NH₂ | 2-methoxyphenyl | Red. |
| 15 | Same as above | 2,5-dimethoxyphenyl | Red. |
| 16 | 3-amino-4-(SO₂-NH-C(=NH)-NH₂)-phenyl | 2,5-dimethoxy-4-chlorophenyl | Red. |
| 17 | 4-amino-3-(SO₂NH-C(=NH)-NH₂)-phenyl | Same as above | Red. |

| Example No. | Diazo component | R''' | Shade in PVC |
|---|---|---|---|
| 18 | Br-C6H3(NH2)-SO2NH-C(=NH)-NH2 | ...do... | Red. |
| 19 | NH, Cl-C6H3-SO2-NH-C(=NH)-NH2 | ...do... | Red. |
| 20 | NH2, CH3-C6H3-SO2-NH-C(=NH)-NH2 | OCH3, Br, OCH3 substituted phenyl | Red. |
| 21 | CH3, NH2, H3C-C6H2-SO2-NH-C(=NH)-NH2 | OCH3, OCH3, Cl substituted phenyl | Red-brown. |
| 22 | CH3, NH2, Cl-C6H2-SO2-NH-C(=NH)-NH2 | Same as above | Do. |
| 23 | NH2, Cl, Cl-C6H2-SO2-NH-C(=NH)-NH2 | ...do... | Brown. |
| 24 | NH2, CH3, H3C-C6H2-SO-NH-C(=NH)-NH2 | ...do... | Red-brown. |
| 25 | CH3, NH2, H3C-C6H2-SO2NH-C(=NH)-NH2 | OCH3 substituted phenyl | Red. |

| Example No. | Diazo component | R''' | Shade in PVC |
|---|---|---|---|
| 26 | 4-amino-3-methyl-6-chlorobenzenesulfonylguanidine (CH₃, Cl, NH₂, SO₂—NH—C(=NH)—NH₂) | Same as above | Red. |
| 27 | 4-amino-3,5-dichlorobenzenesulfonylguanidine (NH₂, Cl, Cl, SO₂—NH—C(=NH)—NH₂) | ...do... | Red. |
| 28 | 4-amino-3,5-dimethylbenzenesulfonylguanidine (NH₂, CH₃, H₃C, SO₂—NH—C(=NH)—NH₂) | ...do... | Red. |
| 29 | 4-amino-3-methylbenzenesulfonylguanidine (NH₂, CH₃, SO₂—NH—C(=NH)—NH₂) | ...do... | Red. |
| 30 | Same as above | 2,5-dimethoxyphenyl (OCH₃, OCH₃) | Red. |
| 31 | ...do... | 2,5-dimethoxy-4-chlorophenyl (OCH₃, Cl, OCH₃) | Red. |
| 32 | 4-amino-2,5-dimethoxybenzenesulfonylguanidine (NH₂, OCH₃, CH₃O, SO₂—NH—C(=NH)—NH₂) | 2,5-dimethoxy-4-chlorophenyl (OCH₃, OCH₃, Cl) | Bordeaux. |
| 33 | 4-aminobenzenesulfonylguanidine (NH₂, SO₂—NH—C(=NH)—NH₂) | —C₆H₄—SO₂NH—C(=NH)—NH₂ | Red. |
| 34 | 2-methoxy-5-(N,N-diethylsulfamoyl)aniline (OCH₃, NH₂, SO₂N(C₂H₅)₂) | Same as above | Red. |

| Example No. | Diazo component | R''' | Shade in PVC |
|---|---|---|---|
| 35 | 4-methyl-3-amino-benzenesulfonylguanidine (CH₃, NH₂, SO₂NH-C(=NH)-NH₂) | 2,5-dimethoxyphenyl (OCH₃, OCH₃) | Red. |
| 36 | 2,5-dimethyl-4-amino-benzenesulfonylguanidine | Same as above | Red. |
| 37 | 2-methyl-5-chloro-4-amino-benzenesulfonylguanidine | do | Red. |
| 38 | 2,5-dimethyl-4-amino-benzenesulfonylguanidine (isomer) | do | Red. |
| 39 | 2,5-dimethyl-4-amino-benzenesulfonylguanidine | 2,5-dimethoxy-4-chlorophenyl | Red. |
| 40 | 2-methyl-5-chloro-4-amino-benzenesulfonylguanidine | Same as above | Red. |
| 41 | 2,5-dimethyl-4-amino-benzenesulfonylguanidine | do | Red. |
| 42 | 2-methyl-4-amino-benzenesulfonylurea (SO₂-NH-C(=NH)-O-NH₂) | naphthyl | Red. |
| 43 | Same as above | —H | Red. |

The components listed in the following table can likewise be reacted as described in Example 1 to give excellent pigments.

| Example No. | Diazo component | Coupling component | Shade in PVC |
|---|---|---|---|
| 44 | 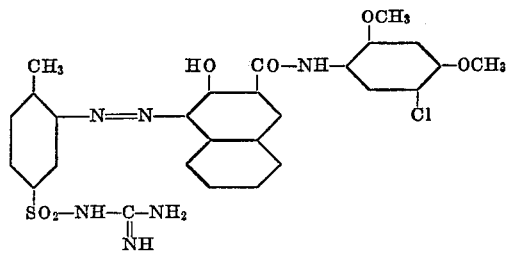 | 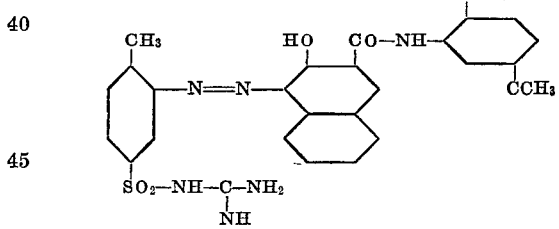 | Yellow. |
| 45 | 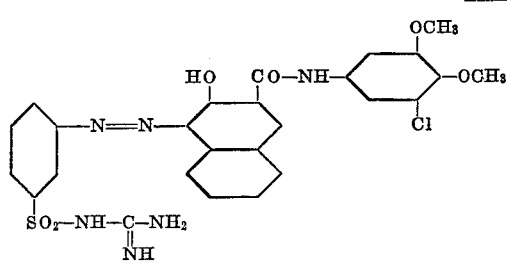 | Same as above | Do. |
| 46 | 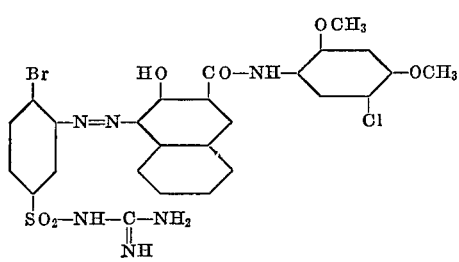 | do | Do. |

Formulae of representative dyestuffs of the foregoing examples are as follows:

Example 7

Example 9

Example 18

Example 35

Example 3

Having thus disclosed the invention what we claim is:
1. Azo dyestuff of the formula $$D-N=N-E$$

wherein
D is unsubstituted phenyl or phenyl substituted by at least one member selected from the group consisting of chlorine, bromine, methyl, methoxy, lower alkyl sulphonic acid amide and $m$ groups of the formula

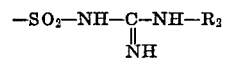

E is a coupling component of the formula

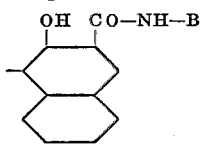

where the free valency bond leads directly to a nitrogen of the azo bridge;

B is a member selected from the group consisting of unsubstituted naphthyl, and phenyl substituted by at least one member selected from the group consisting of chlorine, bromine, methyl methoxy and $n$ groups of the formula

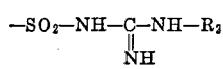

$m$ is 0 or 1,
$n$ is 0 or 1 and the sum of $m+n$ is at least one;
$R_2$ is hydrogen or a group of the formula

and
x is oxygen or =NH.

2. Monoazo dyestuff according to claim 1 wherein X is the =NH group.

3. Dyestuff according to claim 2 of the formula

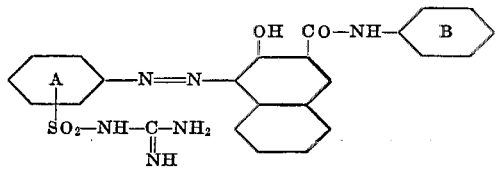

wherein any further substituent on nucleus A is a member selected from the group consisting of chloro, bromo, methyl, methoxy and dimethylaminosulfonyl and any substituent on nucleus B is a member selected from the group consisting of chloro, bromo, methyl and methoxy.

4. The dyestuff according to claim 3 of the formula

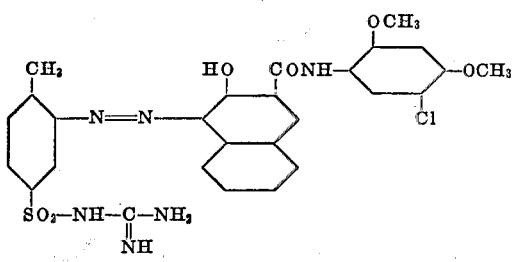

5. The dyestuff according to claim 3 of the formula

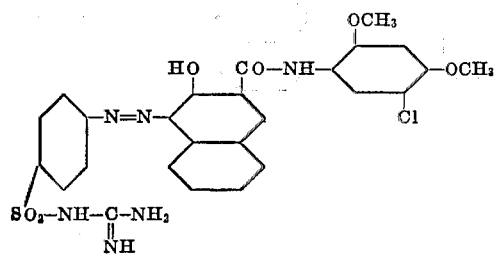

6. The dyestuff according to claim 3 of the formula

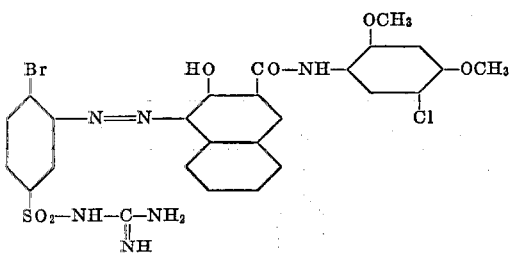

7. The dyestuff according to claim 3 of the formula

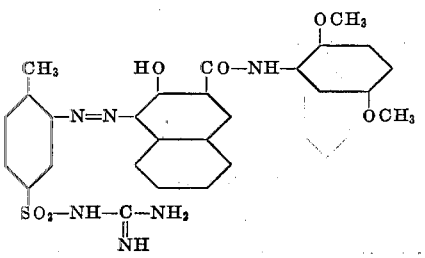

8. The dyestuff according to claim 3 of the formula

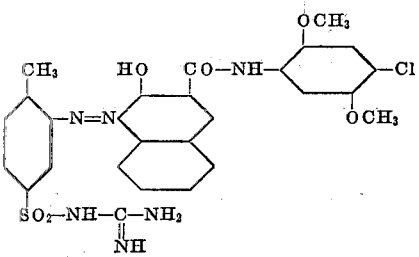

References Cited

UNITED STATES PATENTS

| | | | |
|---|---|---|---|
| 2,367,072 | 1/1945 | Thurston | 260—207X |
| 2,367,073 | 1/1945 | Thurston | 260—207X |
| 2,920,070 | 1/1960 | Jirou et al. | 260—207X |
| 3,096,356 | 7/1963 | Jirou et al. | 260—192X |
| 3,260,713 | 7/1966 | St. Alban | 260—207X |

FOREIGN PATENTS

| | | | |
|---|---|---|---|
| 785,672 | 10/1957 | Great Britain | 260—204 |
| 1,392,484 | 1965 | France | 260—192 |

CHARLES B. PARKER, Primary Examiner

C. F. WARREN, Assistant Examiner

U.S. Cl. X.R.

8—4, 5, 7; 260—162, 163, 193, 196, 197, 198 199, 203, 205, 206, 207, 207.1, 556